(12) United States Patent
Motzet et al.

(10) Patent No.: US 10,167,229 B2
(45) Date of Patent: Jan. 1, 2019

(54) QUICK-DRYING BUILDING MATERIAL COMPOSITION BASED ON A MINERAL HYBRID BINDER

(71) Applicant: SIKA TECHNOLOGY AG, Baar (CH)

(72) Inventors: Hubert Motzet, Rosendahl (DE);
Wolfgang Börsting, Billerbeck (DE);
Markus Knoebel, Coesfeld (DE);
Thomas Meinersmann, Billerbeck (DE)

(73) Assignee: SIKA TECHNOLOGY AG, Baar (CH)

( * ) Notice: Subject to any disclaimer, the term of this patent is extended or adjusted under 35 U.S.C. 154(b) by 50 days.

(21) Appl. No.: 15/300,813

(22) PCT Filed: Mar. 30, 2015

(86) PCT No.: PCT/EP2015/056881
§ 371 (c)(1),
(2) Date: Sep. 30, 2016

(87) PCT Pub. No.: WO2015/150319
PCT Pub. Date: Oct. 8, 2015

(65) Prior Publication Data
US 2017/0029333 A1 Feb. 2, 2017

(30) Foreign Application Priority Data

Mar. 31, 2014 (EP) .................................. 14162889

(51) Int. Cl.
| | | |
|---|---|---|
| C04B 28/14 | (2006.01) |
| C04B 28/06 | (2006.01) |
| C04B 28/16 | (2006.01) |
| C04B 14/06 | (2006.01) |
| C04B 14/28 | (2006.01) |
| C04B 111/00 | (2006.01) |
| C04B 111/34 | (2006.01) |
| C04B 111/60 | (2006.01) |
| C04B 103/32 | (2006.01) |
| C04B 111/32 | (2006.01) |

(52) U.S. Cl.
CPC ............ C04B 28/141 (2013.01); C04B 14/06 (2013.01); C04B 14/28 (2013.01); C04B 28/06 (2013.01); C04B 28/065 (2013.01); C04B 28/145 (2013.01); C04B 28/16 (2013.01); C04B 2103/32 (2013.01); C04B 2111/00672 (2013.01); C04B 2111/00681 (2013.01); C04B 2111/32 (2013.01); C04B 2111/34 (2013.01); C04B 2111/60 (2013.01)

(58) Field of Classification Search
CPC ..... C04B 28/141; C04B 28/06; C04B 28/145; C04B 28/16; C04B 28/065; C04B 14/06; C04B 14/28; C04B 2111/00672; C04B 2111/34; C04B 2111/60; C04B 2111/00681; C04B 2111/32; C04B 2103/32
See application file for complete search history.

(56) References Cited

U.S. PATENT DOCUMENTS

2006/0118006 A1† 6/2006 Amathieu

FOREIGN PATENT DOCUMENTS

| | | | |
|---|---|---|---|
| DE | 3218446 A1 † | 11/1983 |
| DE | 19754826 A1 † | 6/1998 |
| DE | 10159339 A1 | 6/2002 |
| DE | 20121423 U1 † | 1/2003 |
| DE | 60304041 T2 | 11/2006 |
| EP | 0379477 B1 | 4/1993 |
| JP | 58-049651 A | * | 3/1983 |
| JP | 58-079071 A | * | 5/1983 |
| JP | 2005-298221 A | * | 10/2005 |
| JP | 2007-238369 A | * | 9/2007 |
| KR | 20090121657 A | * | 11/2009 |
| WO | 96/035649 A1 | 11/1996 |
| WO | 2014108436 A1 † | 7/2014 |

OTHER PUBLICATIONS

Sep. 14, 2015 International Search Report issued in International Patent Application No. PCT/EP2015/056881.
Oct. 4, 2016 International Preliminary Report on Patentability issued in International Patent Application No. PCT/EP2015/056881.
Mar. 6, 2018 Office Action issued in Australian Application No. 2015239675.

\* cited by examiner
† cited by third party

*Primary Examiner* — Anthony J Green
(74) *Attorney, Agent, or Firm* — Oliff PLC

(57) ABSTRACT

A quick-drying gypsum composition, in particular for use as gypsum filling compound and for the production of floor coverings, wherein the gypsum composition contains 20 to 70% of a mixture of calcium aluminate and calcium sulfate hemihydrate and/or anhydrite and/or calcium sulfate dihydrate as hydraulic binders and 30 to 80% by weight of fillers, and wherein the weight ratio of calcium aluminate to calcium sulfate hemihydrate and/or anhydrite and/or calcium sulfate dihydrate binders lies in the range from 1:1 to 1:5. Gypsum compositions of this type are characterized by a particularly beneficial shrinkage behavior, such that stresses and cracks in the dried composition can be avoided. At the same time, the gypsum compositions dry to readiness for covering in a time that is compatible with conventional cement filling compounds.

20 Claims, 1 Drawing Sheet

QUICK-DRYING BUILDING MATERIAL COMPOSITION BASED ON A MINERAL HYBRID BINDER

TECHNICAL FIELD

The present invention relates to quick-drying building material compositions based on a mineral hybrid binder for use in interior finishing, more particularly for use as filling compound for floor coverings. As well the fact that they dry significantly more quickly in comparison to conventional filling compounds, the building material compositions of the invention are notable for the fact that they give a low-shrinkage, low-tension product featuring high flexural tensile strengths and compressive strengths.

PRIOR ART

Building materials are formulated predominantly on the basis of Portland cement, aluminate cement or calcium sulfate (gypsum) binders. Combinations of these three binders are also referred to as ternary mixtures.

In flooring constructions there is a need for low-tension building materials, which frequently are based on calcium sulfate binders. In their set condition, these binders take the form of gypsum or calcium sulfate dihydrate ($CaSO_4 \times 2 H_2O$). For use as a binder, the raw gypsum must first be dewatered, an operation accomplished by means of temperature treatment. During this treatment, in a first dewatering stage at 120° C., calcium sulfate dihydrate forms calcium sulfate hemihydrate ($CaSO_4 \times \frac{1}{2} H_2O$), which on a further increase in temperature to around 350° C. is transformed into calcium sulfate anhydrite ($CaSO_4$ anhydrous). On addition of water—the mixing water in the preparation of the building material—both the calcium sulfate hemihydrate and the anhydrite react to form the calcium sulfate dihydrate again.

The setting reaction of the hemihydrate is usually relatively quick, and so the gypsum building material attains high strengths after just a few days. A disadvantage in the case of building materials based predominantly on gypsum, however, is that the setting reaction absorbs only about 13% by mass of the mixing water (based on the binder hemihydrate), whereas, for example, cementitious binders are capable of binding up to 70% by mass of the mixing water. Given the fact that more water is generally required for mixing than the gypsum building materials are able to absorb, it is usually the case that the excess water must be evaporated in order for such building materials to cure to the point where they are ready to accept a covering. This evaporation takes time, a time which must be allowed to elapse before further work proceeds.

In comparison, for example, to cement filler compounds, however, gypsum filling compounds have the advantage of significantly lower shrinkage. After solidifying, cement filling compounds initially swell, but this swelling is overcompensated by the shrinkage that begins after physical drying, and so overall there is a contraction in the compound. As a result of this shrinkage, cementitious filling compounds, in an integrated system with the substrate, may build up considerable stresses, and they may lead to cracking and delamination of cement filling compounds joined inadequately to the substrate.

In the case of gypsum filling compounds, in contrast to cement filling compounds, there is a greater fraction of water that must evaporate, and so in the case of gypsum filling compounds the chemical shrinkage is smaller. After the drying of such filling compounds, therefore, only a small change in dimension relative to the zero value is obtained.

A substantial disadvantage of gypsum-based filling compounds, however, as indicated above, is that they only dry very slowly. Since only a small part of the mixing water is bound by hydration of the calcium sulfate, the predominant part of the water must be given off to the surroundings. Particularly in the case of relatively high layer thicknesses, of 6 to 50 mm, for example, or in the case of adverse atmospheric conditions with high humidity, this results in drying times of several days to weeks. This drying time can then be shortened only by additional measures, such as the use of dehumidifiers or air exchange, such measures nevertheless entailing a relatively high financial outlet.

In view of the state of affairs outlined above, the advantages of gypsum filling compounds are manifested in particular on substrates where chemical and physical compatibility are important. On anhydrite screeds, for example, there cannot be any harmful interaction between the screed and a gypsum filling compound applied to it, and so priming of the screed is generally required only for reasons of reduction in absorption. As a result, a gypsum filling compound can be applied without a waiting time to the primer, without having to wait for the primer to fully dry.

Filling compounds, especially those which are used in the sector of flooring, preferably for the smoothing, leveling and/or settling of substrates, and which are subsequently provided with a utility covering, are known in various compositions. For example, EP 0 379 477 B describes a filling compound which comprises substantially cement as binder. This filling compound further comprises gypsum in a maximum concentration of 10 wt %, which is used to compensate shrinkage and as a flow improver. Furthermore, the filling compound contains up to 3 wt % of polypropylene fibers, which are intended to endow the cementitious filling compound with additional strength and improved deformation qualities.

A quick-curing cementitious binder of low shrinkage is described in DE 197 54 826 A1. As well as a substantial fraction of quick-curing Portland cement with a $C_3A$ clinker phase fraction in the range from 4% to 12% by mass, the binder includes a small fraction of calcium sulfate compounds, calcium hydroxide, and, optionally, other additives. In DE 197 54 826 A1, shrinkage is minimized by a precise harmonization of the ettringite formed within the composition, which leads to expansion of the binder, and the Portland cement, which is a cause of shrinkage.

A filling compound having undergone further development is described in DE 101 59 339 A2, and comprises as its binder a mixture of calcium sulfate hemihydrate with a second hydraulic binder, the mass ratio of the calcium sulfate to the second binder varying between 8:1 and 8:0.1. The binders described in DE 101 59 339 A2 further comprise fibers of, for example, polyacrylonitrile. A disadvantage with the filling compounds disclosed in DE 101 59 339, however, as already indicated above, is that in view of the high fraction of calcium sulfate binder, the compositions only dry relatively slowly, and that therefore a relatively long time must be allowed to elapse until the surface provided with the filling compound can receive a further covering or be further worked on.

DE 32 18 446 A1 describes a binder for a building material mixture based on calcium aluminate in the form of mono- to tricalcium aluminate in fine-particle form with finely ground gypsum in the form of anhydride, hemihydrate or dihydrate, the two constituents being mixed in an amount such that there are 3 mol or more of calcium sulfate per mol of aluminum oxide in the calcium aluminate compound. The binder may additionally be mixed with calcium carbonate and used as fire prevention material, since it features a high fraction of water bound in crystalline form.

WO 96/35649 is likewise concerned with materials featuring high fire resistance, and comprising, as well as calcium aluminate hydrate and/or calcium sulfate dihydrate, at least 5 wt % of ettringite and/or aluminum phosphate. On the one hand, the ettringite and/or aluminum phosphate give the material good mechanical properties; on the other hand, on heating, the ettringite and/or aluminum phosphate undergoes energy-consuming decomposition, thus endowing the material with flame retardancy properties.

DE 201 21 423 A1 describes a filling compound based on a mixture of calcium sulfate and a second hydraulic binder, which may consist of Portland cement, Portland composite cement, blast furnace cement and/or calcium aluminate cement. The ratio of calcium sulfate binder to second binder is said to be in the range from 8:1 to 8:0.1. The simple establishment of a desired rheological behavior is said to be possible by varying the ratio.

DE 603 04 041 T2, finally, is concerned with an ettringite binder based on calcium sulfates and calcium aluminate compounds for use in dense mortars which can be employed for producing or repairing constructions that are to commence operation within a short time. The binder described in DE 603 04 041 T2 is harmonized in such a way that the calcium ions and aluminum ions are released simultaneously and with uniform distribution throughout the hydration process, allowing the ettringite to be formed without premature blocking at the intersections of the water-free particles in the binder. For the compositions of DE 603 04 041 T2, a minimal shrinkage of 0.6 mm/m after seven days of drying at 50% relative humidity is reported.

BRIEF SUMMARY OF THE INVENTION

An objective of the present invention, therefore, was to provide a quick-drying gypsum composition, intended more particularly for use as filling compound or for producing a floor covering, and combining the advantages of known gypsum filling compounds, particularly an advantageously low shrinkage and a low development of tension, with the advantages of high strength and rapid ongoing workability.

In accordance with the invention, these objects are by a composition comprising
a) about 20 to 70 wt % of a mixture of calcium aluminate and calcium sulfate hemihydrate and/or anhydrite and/or dihydrate as hydraulic binders, where the weight ratio of calcium aluminate to calcium sulfate hemihydrate and/or anhydrite and/or dihydrate binders is in the range from 1:1 to 1:5, and
b) about 30 to 80 wt % of fillers, the weight figures being based in each case on the dry weight of the gypsum composition.

DETAILED DESCRIPTION

Figure 1:
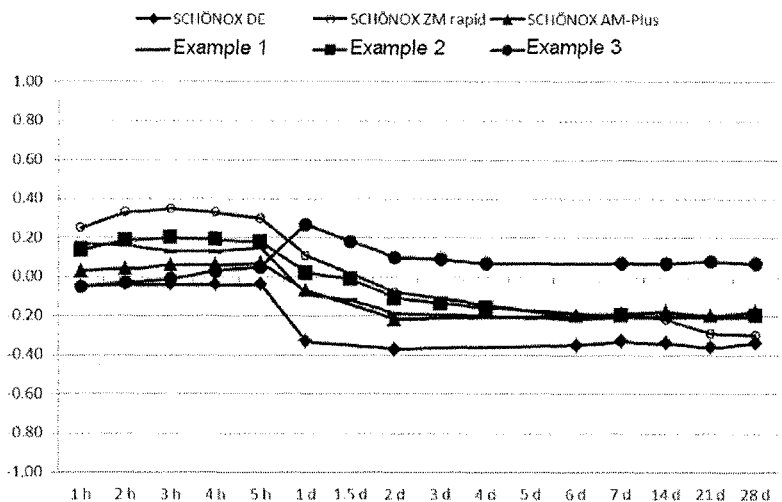
FIG. 1 illustrates the results of the determination of the shrinkage characteristics over the period from 3 h to 28 d under the conditions of drying at 50% relative humidity.

Calcium aluminate in the sense of the present invention refers to inorganic compounds consisting substantially of calcium oxide and aluminum oxide constituents. Calcium aluminate is therefore different, for example, from calcium aluminate cements, which in addition to aluminum oxide and calcium oxide also contains substantial fractions of silicon dioxide and iron oxides. For the purposes of the present invention, therefore, calcium aluminates refer to compounds in which the maximum $SiO_2$ and iron oxide ($Fe_2O_3$) content, based on the weight of the compound, is below 15 wt %. The combined amount of CaO and $Al_2O_3$ is preferably more than 80 wt %, more preferably more than 85 wt %, more particularly more than 90 wt %, and most preferably more than 95 wt %. These figures are based on the anhydrous composition in other words, any water content in the calcium aluminate is not included in the calculation of the $Al_2O_3$ or CaO and/or $SiO_2$ or iron oxide ($Fe_2O_3$) contents. Where one calcium aluminate suitable for the purposes of the present invention is available as Ternal RG from Kerneos GmbH.

Calcium sulfate hemihydrate for the purposes of the present invention refers to the compound $CaSO_4 \times \frac{1}{2}H_2O$, calcium sulfate anhydrite means the compound $CaSO_4$ (anhydrous), and calcium sulfate dihydrate is the compound $CaSO_4 \times 2\, H_2O$.

Substances identified for the purposes of the present invention as "binders" are notable in that as a consequence of contact with water, they absorb water molecules and incorporate them into the crystal lattice. An exception to this rule, solely, is calcium sulfate dihydrate, which is unable to bind any further water, but for considerations of convenience will be treated as a binder.

In the context of the present invention it has emerged as being favorable if the weight ratio of calcium aluminate to calcium sulfate hemihydrate and/or calcium sulfate anhydrite and/or calcium sulfate dihydrate is in the range from about 1:1.6 to 1:4, preferably in the range from about 1:2 to 1:3.5, and more preferably in the range from about 1:2.1 to 1:2.8. There are advantages, moreover, associated if the gypsum composition contains about 20 to 60 wt %, preferably about 35 to 55 wt %, of the mixture of calcium aluminate and calcium sulfate hemihydrates—and/or anhydrite and/or calcium sulfate dihydrate binder.

In relation to the calcium sulfate binders, it is further preferred for them to consist substantially of calcium sulfate hemihydrate, since too high a proportion of anhydrite leads to excessively rapid absorption of water by the anhydrite constituent, and this may be detrimental to the workability of the composition. It is preferred, consequently, if at least 80 wt %, preferably at least 90 wt %, and more preferably at least 95 wt % of the total amount of calcium sulfate hemihydrate, and anhydrite and dihydrate, is accounted for by the calcium sulfate hemihydrate. Where one suitable calcium sulfate binder is available, for example, under the trade name Hartformgips from Saint-Gobain Formula GmbH.

The fraction of calcium sulfate dihydrate among the total amount of calcium sulfate hemihydrate, anhydrite and dihydrate ought not to be too high, since the calcium sulfate dihydrate is unable to bind water. It is therefore preferred if the fraction of the calcium sulfate dihydrate is 10 wt % or less, more particularly 5 wt % or less, based on the total weight of the calcium sulfate hemihydrate, anhydrite, and dihydrate binders. In one particularly preferred embodiment, the composition of the invention comprises 1 to 5 wt % of calcium sulfate dihydrate, based on the total weight of the calcium sulfate hemihydrate, anhydrite, and dihydrate binders. In an alternative embodiment, the composition of the invention comprises less than 0.1 wt % of calcium sulfate dihydrate, based on the total weight of the calcium sulfate hemihydrate, anhydrite, and dihydrate binders.

With regard to the fillers to be incorporated into the gypsum composition, there are no relevant restrictions on the composition, with the exception that, if the intention is to formulate pale-colored gypsum compositions, no fillers that have a very dark shade ought to be incorporated. Particularly suitable fillers in the context of the invention are, in particular, carbonatic fillers, preferably in the form of calcium carbonate such as finely ground limestone, for example, and sand, more particularly silica sand. One particularly suitable silica sand has a grading curve in the range from about 0 to 0.5 mm, preferably in the range from about 0.08 to 0.4 mm. Another suitable silica sand has a particle size in the range from about 0.1 to 1 mm, preferably from about 0.2 to 0.8 mm.

Suitable calcium carbonate has an average particle diameter in the range from 2.5 μm and a granulometric curve with absence of residue of about 40 μm. A calcium carbonate of this kind is sold for example under the trade name Mikrosöhl by the company Söhlde. One suitable finely ground limestone has a fineness of <0.1 mm.

With regard to the fillers content, it is preferred for it to be in the range from about 35% to 75 wt %.

For the above-described gypsum compositions it is preferred, furthermore, if they comprise a lithium salt which accelerates the curing of the composition. Suitable lithium salts are, in particular, lithium sulfate and lithium halides, especially lithium chloride, and also lithium carbonate. Most preferred for the purposes of the present invention is the use of lithium carbonate.

The lithium salts are incorporated into the gypsum composition usefully in an amount of about 0.001 to 0.05 wt %, preferably in an amount of about 0.005 to 0.02 wt %. Below an amount of 0.001%, the concentration of the lithium salt is too low to impart any significantly accelerating effect, whereas an addition of more than 0.05 wt % leads to excessively rapid curing of the composition, and is therefore detrimental to its workability.

Within the investigations on which the present invention is based, moreover, it surprisingly emerges that the addition of tartaric acid and/or a tartaric salt has positive consequences for the expansion behavior, and in particular prevents excessive expansion of the material. Particularly suitable for this purpose are alkali metal salts of tartaric acid, preferably in the form of sodium or potassium tartrate or of the mixed sodium/potassium tartrate salt. Of these, sodium/potassium tartrate is most preferred.

The tartaric acid and/or a tartaric salt is incorporated into the gypsum composition usefully in an amount of about 0.15 to 0.005 wt %, preferably about 0.1 to 0.01 wt %, and more preferably about 0.08 to 0.015 wt %. An amount of less than 0.005 wt % does not lead to any significant influencing of the expansion behavior, whereas an amount of more than 0.15 wt % causes excessive delay to the setting rate, leading to a situation in which inadequate service properties are achieved, such as strength or surface hardness.

In addition to the constituents already mentioned, the gypsum composition may further comprise other customary constituents, more particularly plasticizers, thickeners, dyes and/or color pigments, defoamers, stabilizers, curing retarders and/or flexibilizing agents. As a result of adding additives of this kind that are known per se, it is possible, for example, to improve the leveling properties and the rheological behavior and to adapt them to the particular requirements, to prevent foaming and/or to retard the solidification (full curing) of the filler. The total concentration of such additives is usefully between about 0.1 and 10 wt %, preferably between about 0.5 and 5 wt %, and more preferably between about 1 and 3 wt %.

Suitable colorants in the gypsum compositions of the invention include iron oxides. As flexibilizing agents and/or for improving the adhesion to the substrate, it is possible to add organic polymers, based for example on vinyl acetate and ethylene. One suitable flexibilizing agent is available under the name Vinnapas 5025 L from Wacker.

Suitable stabilizers are hydroxyethylcelluloses, available for example as Tylose H 20 P2 from Shin Etsu SE Tylose GmbH & Co. KG.

Suitable thickeners include methylcelluloses, sold for example under the trade name Culminal®. It may be useful and desirable, moreover, to add a "superplasticizer" as plasticizer to the gypsum compositions of the invention, in the form, for example, of a polycarboxylate ether, which is readily familiar to the person skilled in the art of cement chemistry.

One suitable retarder is available, for example, under the trade name Retardan®P from Sika Technology AG. Other suitable retarders are sodium gluconate or sodium citrate.

A suitable defoamer is available for example under the trade name Foamstar PB1922 from BASF.

As is evident from the above, the gypsum composition of the invention is a composition whose curing is dependent substantially on the absorption and incorporation of water by the gypsum and calcium aluminate binders. Not excluded, nevertheless, is the additional presence within the gypsum composition of a fraction of cement binders, at up to about 5 wt %, for example, but preferably not more than about 3 wt %, more particularly not more than about 1 wt %, and most preferably not more than about 0.1 wt % cement binders.

The expression "cement binders" refers for the purposes of the present invention in particular to Portland cements, Portland composite cements, and blast-furnace cements, and also calcium aluminate cements.

Preferably as a consequence of its curing, after 28 days, the gypsum composition of the invention exhibits shrinkage of not more than ±0.5 mm/m when the curing takes place at 25° C. and 50% relative humidity. Additionally or alternatively it is preferred if the gypsum composition of the invention, as a consequence of its curing, exhibits a shrinkage of not more than ±0.5 mm/m after 3 hours when the curing takes place at 25° C. and 50% relative humidity. It is especially preferred in the context of the present invention if there is no shrinkage of more than ±0.5 mm/m throughout the curing period of 28 days on curing at 25° C. and 50% relative humidity. In the above, a positive value for the shrinking is an expansion of the cured composition by the figure identified, whereas a negative shrinkage characterizes contraction of the composition by the value identified. For the purposes of the present invention, the shrinkage is determined in accordance with the method specified in the Examples section. To the person skilled in the art it is entirely clear that the amounts of the individual constituents in the gypsum composition of the invention are dependent also on the application and more particularly on the thickness in which the material is applied. For a thick layer of the gypsum composition of the invention, for example, a binder content in the range from about 20 to 45 wt %, more particularly about 25 to 40 wt %, is sufficient, while the amount of fillers in this case may be greater and is situated in particular in the range from about 50 to 80 wt %, preferably about 55 to 70 wt %, and very preferably about 60 to 65 wt %. For a thin layer of the gypsum composition of the invention, on the other hand, it is useful to select a higher fraction of binder, more particularly in the range from about 45 to 70 wt %, preferably about 50 to 60 wt %, while the filler fraction is lower accordingly and is situated in particular in the range from about 30 to 50 wt %, preferably about 40 to 45 wt %. A thick layer in the context of this invention refers to a layer of 10 mm or more, preferably 20 mm or more, up to 60 mm or more. A thin layer, accordingly, is a layer with a thickness of less than 10 mm, preferably having a thickness in the range from 1 to 6 mm.

One particularly advantageous embodiment of the gypsum composition of the invention comprises
8 to 20 wt % of calcium aluminate binder,
25 to 50 wt % of calcium sulfate hemihydrate,
5 to 12 wt % of calcium carbonate as filler,
30 to 55 wt % of silica sand,
0.01 to 0.10 wt % of potassium sodium tartrate, and
0.005 to 0.015 wt % of lithium carbonate.

One particularly advantageous embodiment of the gypsum composition of the invention for the application of a thick layer comprises
8 to 15 wt % of calcium aluminate binder,
25 to 40 wt % of calcium sulfate hemihydrate,
5 to 15 wt % of calcium carbonate as filler,
40 to 65 wt % of silica sand,
0.01 to 0.15 wt % of potassium sodium tartrate, and
0.005 to 0.015 wt % of lithium carbonate.

One particularly advantageous embodiment of the gypsum composition of the invention for the application of a thin layer comprises
12 to 20 wt % of calcium aluminate binder,
30 to 50 wt % of calcium sulfate hemihydrate,
8 to 15 wt % of calcium carbonate as filler,
25 to 45 wt % of silica sand,
0.01 to 0.15 wt % of potassium sodium tartrate, and
0.005 to 0.015 wt % of lithium carbonate.

For the purposes of the present invention it is further preferred if the composition after curing for one day at 25° C. and 75% relative humidity has a residual moisture content of below 5 wt % when it has been applied in a thickness of up to 60 mm to a substrate.

It is preferred, moreover, if the gypsum composition after curing for 28 days at 50% relative humidity at 25° C. has a compressive strength of at least 30 $N/mm^2$, preferably at least 40 $N/mm^2$ and more preferably at least 45 $N/mm^2$. There is no essential upper limit on the compressive strength, but it is generally about 70 $N/mm^2$, preferably 60 $N/mm^2$. Alternatively or additionally to this it is useful if the cured gypsum composition after 28 days at 50% humidity and 25° C. has a flexural strength of 8 $N/mm^2$, preferably at least 10 $N/mm^2$, and more preferably at least 11 $N/mm^2$. There is likewise no essential upper limit on the flexural tensile strength, but it is generally 25 $N/mm^2$, preferably 20 $N/mm^2$, and more preferably 16 $N/mm^2$.

It is preferred, furthermore, that after just a short time, i.e., one day (24 hours), the composition has a relatively high compressive strength and flexural tensile strength. Hence the compositions of the invention preferably, after curing for one day at 50% relative humidity and 25° C., have a compressive strength of at least 10 $N/mm^2$, preferably at least 18 $N/mm^2$, and more preferably at least 20 $N/mm^2$. For the maximum compressive strength, the same statements apply as after 28 days' curing. Generally, however, the compressive strength after one day is about 50% lower than after 28 days' curing.

The minimum flexural tensile strength after one day under corresponding conditions is preferably at least 2 $N/mm^2$, more particularly at least 3.5 $N/mm^2$, and more preferably at least 4 $N/mm^2$. The upper limit on the flexural tensile strength after this time may be about 8 $N/mm^2$, preferably about 6 $N/mm^2$.

A further aspect of the present invention concerns a method for applying a gypsum composition to a substrate, comprising the following steps:
mixing a gypsum composition as described above with water to form a fluid or pastelike gypsum composition,
applying the fluid or pastelike gypsum composition to a substrate, and
curing the composition.

As already set out above, a filling compound produced from the gypsum composition of the invention has a rheological behavior which is adapted to the particular requirements, this behavior being adjustable through the selection of the ingredients and via the ratio of the gypsum composition to water. Preferably the composition composed of the gypsum composition of the invention with water is processed in a mass ratio of water/gypsum compositions of 0.10 to 0.40, more particularly of 0.12 to 0.30, and preferably of 0.15 to 0.26, to give a fluid or pastelike gypsum composition, and the ingredients of the gypsum composition here ought to have an extremely homogeneous distribution.

The fluid or pastelike gypsum composition is preferably self-leveling. Furthermore, a fluid or pastelike gypsum composition produced accordingly by the method of the invention is preferably pumpable, allowing it to be conveyed to any locations using conventional pumps which are known from and used in the field of the art.

As regards the substrate to which the fluid or pastelike gypsum composition can be applied, the present invention is not subject to any relevant restrictions. The substrate, however, ought to be such that the gypsum composition, after drying, adheres firmly to the substrate. Substrates contemplated, as well as all kinds of standard substrates, such as mineral screeds or dry screeds, include, in particular, floor coverings, such as wooden board floors, fixed woodblock, wood particle board, wood-cement boards, old substrates with ceramic coverings, old substrates based on screeds of any kind or concrete, and also substrates prone to deformation, such as bituminous asphalt screed. A particularly suitable substrate is an anhydrite screed.

A further aspect of the present invention concerns a gypsum composition, as described above, as gypsum filling compound or screed. The present invention also concerns the use of a gypsum composition, as described above, for producing a floor covering or as constituent as a floor covering.

For the gypsum compositions of the invention, it is particularly noteworthy that in comparison to known gypsum filling compounds they feature accelerated drying, meaning that following the application of composition, further working of the surface coated with them can be commenced sooner. Moreover, the composition can be processed by simple mixing with water into a fluid or pastelike composition which, applied even in a small quantity, forms a filler layer on floor coverings of any kind, this layer, after curing, having excellent compressive strength and flexural tensile strength.

The gypsum compositions of the invention are elucidated in more detail below, using working examples.

EXAMPLES

The compositions of various formulations are specified in table 1:

TABLE 1

| Constituent | Example 1 | Example 2 | Example 3 |
| --- | --- | --- | --- |
| Calcium aluminate | 10 | 15 | 14 |
| Calcium sulfate hemihydrate | 26 | 39 | 33 |
| Calcium sulfate dihydrate | 1 | 1 | 1 |
| Calcium carbonate (2.5 μm) | 7 | 10 | 10 |
| Sand (0.1-0.3 mm) | 21.54 | 33.54 | 27.54 |
| Sand (0.2-0.8 mm) | 33 | | |
| Finely ground limestone | | | 13 |

TABLE 1-continued

| Constituent | Example 1 | Example 2 | Example 3 |
| --- | --- | --- | --- |
| Vinnapas 5025 L | 1 | 1 | 1 |
| Superplasticizer | 0.2 | 0.2 | 0.2 |
| Lithium carbonate | 0.01 | 0.01 | 0.01 |
| K/Na tartrate | 0.1 | 0.1 | 0.1 |
| Foamstar PB 1922 | 0.1 | 0.1 | 0.1 |
| Tylose H 20 P2 | 0.05 | 0.05 | 0.05 |

Example 1 here represents a thick-layer application, and examples 2 and 3 thin-layer applications. The examples differ in the binder content and also in the grading curve of the fillers used. All figures in table 1 are in parts by weight.

The compositions were investigated for their properties. Examinations were made of the compressive strength and flexural tensile strength in accordance with DIN EN 196 Part 1.

The shrinkage was determined in a method based on DIN EN 13872 on test specimens with dimensions of 1*4*16 cm. In deviation from the standard, which prescribes the deshuttering of the test specimens 24 h after the composition has been mixed with water, the specimens were deshuttered 3 hours after mixing. Thereafter the changes in dimension in the lengthwise direction over time, after curing for a period of between 3 h and 3 d, were ascertained. The curing for this purpose took place at 25° C., in one case at 50% relative humidity and in another case at 75% relative humidity. The values reported in table 2 below were determined as the difference between the maximum of the expansion and the minimum value after 28 days.

The residual moisture content for different composition was determined by the calcium carbide method with the aid of a CM instrument (manufacturer: Riedel-de-Haen) after one day (24 h) at 25° C. and 75% relative humidity. The determination was made in a method based on DIN 18560 Part 4. In deviation from the CM method described in DIN 18560-4, the measurement value was read off after 5 minutes.

Recruited additionally, as comparative compositions, were the cement-based compositions "SCHÖNOX ZM Rapid" and "SCHÖNOX DE" and also the gypsum-based composition "SCHÖNOX AM PLUS". The results of the determination of these parameters are evident from table 2 below:

TABLE 2

| | | SCHÖNOX DE | SCHÖNOX ZM Rapid | SCHÖNOX AM-Plus | Ex. 1 | Ex. 2 | Ex. 3 |
| --- | --- | --- | --- | --- | --- | --- | --- |
| Compressive strength [N/mm²] | 1 d | 10.0 | 36.0 | 12.6 | 23.4 | 22.4 | 21.6 |
| | 7 d | 19.0 | 46.2 | 22.0 | 37.7 | 34.2 | 47.9 |
| | 28 d | 24.4 | 55.6 | 40.2 | 49.2 | 45.1 | 58.2 |
| Flexural tensile strength [N/mm²] | 1 d | 3.2 | 7.0 | 2.5 | 4.1 | 3.9 | 3.9 |
| | 7 d | 6.5 | 9.7 | 6.8 | 8.8 | 6.1 | 5.2 |
| | 28 d | 7.6 | 8.8 | 12.3 | 12.3 | 10.1 | 10.5 |
| Shrinkage [mm/m] 50% r.h. | | −0.30 | −0.65 | −0.25 | −0.38 | −0.40 | −0.20 |
| Shrinkage [mm/m] 75% r.h. | | −0.23 | −0.45 | −0.45 | −0.15 | −0.09 | −0.12 |
| Residual moisture content [CM-%] after 24 h at 25° C. and 75% r.h. | | | | | | | |
| 3 mm/1 d | | 5.3 | 2.4 | 4.5 | 3.1 | 3.9 | 4.0 |
| 10 mm/1 d | | 7.2 | 3.7 | 6.0 | 3.6 | 5.0 | 5.0 |
| 20 mm/1 d | | 8.9 | — | 6.7 | 3.9 | — | — |
| 40 mm/1 d | | 10.8 | — | 7.8 | 4.2 | — | — |

Figure 2:
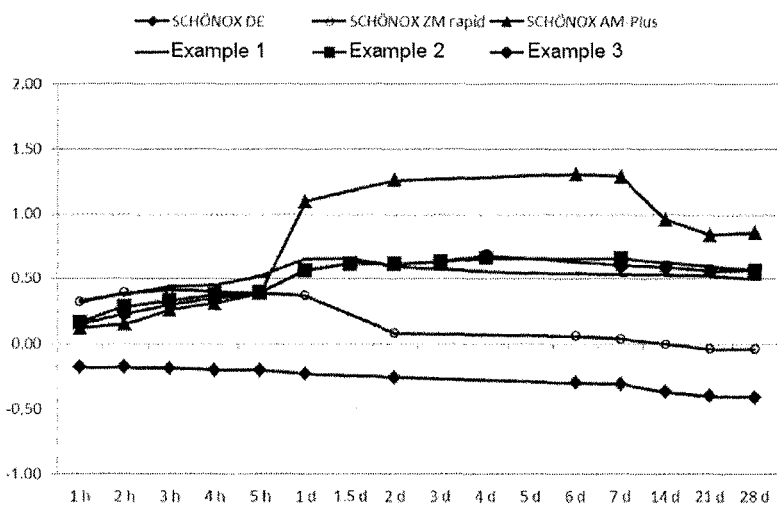
FIG. 2 illustrates the results of the determination of the shrinkage characteristics over the period from 3 h to 28 d under the conditions of drying at 75% relative humidity.

The results of the determination of the shrinkage characteristics over the period from 3 h to 28 d are evident from FIG. 1 (drying at 50% relative humidity) and from FIG. 2 (drying at 75% relative humidity).

From the data determined it is apparent that the compositions of the invention exhibit rapid drying by comparison with conventional gypsum compositions (SCHÖNOX AM PLUS) in conjunction with very low shrinkage behavior.

Relative to cementitious compositions, the compositions of the invention display more rapid drying with comparable shrinkage (SCHÖNOX DE), or lower shrinkage with comparable drying (SCHÖNOX ZM RAPID). The binder compositions of the invention are therefore suitable especially for substrate preparation in the floor sector, where the overall working time can be reduced significantly by virtue of the relatively quick curing and drying.

The invention claimed is:

1. A gypsum composition comprising
20 to 70 wt % of a mixture of calcium aluminate and calcium sulfate hemihydrate and/or anhydrite and/or calcium sulfate dihydrate as hydraulic binders, where the weight ratio of calcium aluminate to calcium sulfate hemihydrate and/or anhydrite and/or calcium sulfate dihydrate binder is in the range from 1:1 to 1:3.5, and
30 to 80 wt % of fillers,
the weight figures being based in each case on the dry weight of the gypsum composition, wherein
at least 80 wt % of the total amount of calcium sulfate hemihydrate, and anhydrite and dihydrate is accounted for by the calcium sulfate hemihydrate, and the gypsum composition is composed of up to about 3 wt % cement binders.

2. The gypsum composition as claimed in claim 1, wherein the weight ratio of calcium aluminate to calcium sulfate hemihydrate and/or anhydrite and/or calcium sulfate dihydrate binder is in the range from 1:1.6 to 1:3.5.

3. The gypsum composition as claimed in claim 1 comprising 20 to 60 wt % of the mixture of calcium aluminate and calcium sulfate hemihydrate and/or anhydrite and/or calcium sulfate dihydrate binder.

4. The gypsum composition as claimed in claim 1 wherein 35 to 75 wt % of the fillers are present in the gypsum composition.

5. The gypsum composition as claimed in claim 1 further comprising a lithium salt.

6. The gypsum composition as claimed in claim 1 further comprising lithium salts in an amount of 0.001 to 0.05 wt %.

7. The gypsum composition as claimed in claim 1 further comprising tartaric acid and/or a tartaric salt.

8. The gypsum composition as claimed in claim 7, wherein the tartaric acid and/or the tartaric salt is present in the gypsum composition at an amount of 0.15 to 0.005 wt %.

9. The gypsum composition as claimed in claim 1, wherein on account of its curing it exhibits after 28 days a shrinkage of not more than +/−0.5 mm/m when curing takes place at 25° C. and 50% relative humidity.

10. The gypsum composition as claimed in claim 1, wherein on account of its curing it exhibits after 3 hours a shrinkage of not more than +/−0.5 mm/m when curing takes place at 25° C. and 50% relative humidity.

11. The gypsum composition as claimed in claim 1, comprising fillers in the form of sand and one or both of calcium carbonate and finely ground limestone.

12. A method for applying a gypsum filling compound to a substrate, comprising:
mixing a gypsum composition as in claim 1 with water to form a fluid gypsum composition or a gypsum composition in paste form,
applying the fluid gypsum composition or the gypsum composition in paste form to a substrate, and
curing the fluid gypsum composition or the gypsum composition in paste form.

13. A gypsum filling compound or screed, comprising:
the gypsum composition of claim 1.

14. A floor covering or a floor covering constituent, comprising:
the gypsum composition of claim 1.

15. A gypsum composition comprising
20 to 70 wt % of a mixture of calcium aluminate and calcium sulfate hemihydrate and/or anhydrite and/or calcium sulfate dihydrate as hydraulic binders, where the weight ratio of calcium aluminate to calcium sulfate hemihydrate and/or anhydrite and/or calcium sulfate dihydrate binder is in the range from 1:1 to 1:3.5, and
30 to 80 wt % of fillers, the fillers comprising sand and one or both of calcium carbonate and finely ground limestone,
the weight figures being based in each case on the dry weight of the gypsum composition, wherein
at least 80 wt % of the total amount of calcium sulfate hemihydrate, and anhydrite and dihydrate is accounted for by the calcium sulfate hemihydrate, and
the gypsum composition is composed of up to about 5 wt % cement binders.

16. A gypsum composition comprising
20 to 70 wt % of a mixture of calcium aluminate and calcium sulfate hemihydrate and/or anhydrite and/or calcium sulfate dihydrate as hydraulic binders, where the weight ratio of calcium aluminate to calcium sulfate hemihydrate and/or anhydrite and/or calcium sulfate dihydrate binder is in the range from 1:1 to 1:3.5,
30 to 80 wt % of fillers, and
one or more additional additives selected from plasticizers, thickeners, dyes, color pigments, defoamers, stabilizers, curing retarders, and flexibilizing agents,
the weight figures being based in each case on the dry weight of the gypsum composition, wherein
at least 80 wt % of the total amount of calcium sulfate hemihydrate, and anhydrite and dihydrate is accounted for by the calcium sulfate hemihydrate, and
the gypsum composition is composed of up to about 5 wt % cement binders.

17. The gypsum composition as claimed in claim 16, wherein the gypsum composition is composed of not more than about 3 wt % of the cement binders.

18. The gypsum composition as claimed in claim 16, comprising fillers in the form of sand and one or both of calcium carbonate and finely ground limestone.

19. A gypsum composition comprising
20 to 70 wt % of a mixture of calcium aluminate and calcium sulfate hemihydrate and/or anhydrite and/or calcium sulfate dihydrate as hydraulic binders, where the weight ratio of calcium aluminate to calcium sulfate hemihydrate and/or anhydrite and/or calcium sulfate dihydrate binder is in the range from 1:1 to 1:3.5, and
30 to 80 wt % of fillers,
the weight figures being based in each case on the dry weight of the gypsum composition, wherein
at least 80 wt % of the total amount of calcium sulfate hemihydrate, and anhydrite and dihydrate is accounted for by the calcium sulfate hemihydrate,
the gypsum composition is composed of up to about 5 wt % cement binders, and
the cement binders comprise at least one member selected from the group consisting of Portland cements, Portland composite cements, and blast-furnace cements.

20. The gypsum composition as claimed in claim 19, comprising fillers in the form of sand and one or both of calcium carbonate and finely ground limestone.

* * * * *